United States Patent
Takeuchi et al.

(10) Patent No.: US 6,305,564 B1
(45) Date of Patent: Oct. 23, 2001

(54) BIAXIALLY STRETCHED BOTTLE HAVING A CARRYING HANDLE

(75) Inventors: Setsuyuki Takeuchi; Nobukuni Ibe, both of Nagano-ken (JP)

(73) Assignee: A. K. Technical Laboratory, Inc., Nagano-ken (JP)

( * ) Notice: Subject to any disclaimer, the term of this patent is extended or adjusted under 35 U.S.C. 154(b) by 0 days.

(21) Appl. No.: 09/446,788

(22) PCT Filed: Apr. 28, 1999

(86) PCT No.: PCT/JP99/02300

§ 371 Date: Dec. 27, 1999

§ 102(e) Date: Dec. 27, 1999

(87) PCT Pub. No.: WO99/57026

PCT Pub. Date: Nov. 11, 1999

(30) Foreign Application Priority Data

Apr. 30, 1998 (JP) .................................................. 10-121367

(51) Int. Cl.[7] .................................................. B65D 23/10
(52) U.S. Cl. ........................... 215/398; 215/397; 220/758; 220/771
(58) Field of Search ..................................... 215/396, 398, 215/399; 220/771, 758

(56) References Cited

U.S. PATENT DOCUMENTS 5,409,749 * 4/1995 Uehara et al. ................... 215/399 X
5,704,507 * 1/1998 Krall et al. ............................. 215/398
5,862,929 * 1/1999 Takeuchi et al. ..................... 215/398

FOREIGN PATENT DOCUMENTS

| 49-137953 | 11/1974 | (JP) . |
| 59-118159 | 8/1984 | (JP) . |
| 7-33840 | 6/1995 | (JP) . |
| 10-218190 | 8/1998 | (JP) . |
| WO 82/02369 | 7/1982 | (WO) . |

* cited by examiner

Primary Examiner—Sue A. Weaver
(74) Attorney, Agent, or Firm—Weingarten, Schurgin, Gagnebin & Hayes LLP

(57) ABSTRACT

A biaxially oriented bottle having a carrying handle is provided. A carrying handle, which is provided at a side surface of a neck portion, and which is injection molded together with the neck portion of a preform, is used without further modification as the carrying handle of a biaxial stretching blow molded, thinly formed bottle. The carrying handle is integrally formed in a U-shaped configuration from a grip portion and arm portions on both ends of the grip portion. The arm portions are integrally formed with base portions comprising projected pieces formed at symmetrical positions on both sides of the neck portion. The arm portions, moreover, extend out to the sides with a length greater than the height of the neck portion. The boundary of the base portion and arm portion is thinly molded by being constricted and forms a connecting portion which can be freely bent in a vertical direction. The base portion is supported by a bracket which is integrally formed with the bottom surface of the base portion and the side surface of the neck portion.

3 Claims, 4 Drawing Sheets

BIAXIALLY STRETCHED BOTTLE HAVING A CARRYING HANDLE

FIELD OF THE INVENTION

The present invention relates to a biaxially stretched bottle with a carrying handle formed integrally with the neck portion of the bottle.

BACKGROUND ART

Biaxially stretched bottles typified by bottles formed from polyethylene terephthalate (PET) are thinly formed by biaxially stretch blow molding vertically and horizontally from portion below the neck portion of an injection molded preform to a bottom portion thereof. Thus, they are different from thick bottles molded by blowing an ejection molded parison. Moreover, the integral molding of handles on the side portion of a bottle is known to be extremely difficult.

As is described in International Publication No. WO82/02369, attempts have been made during injection molding of the preform to form a transversely long carrying handle integrally with a side of the neck portion and to use this without further modification as a carrying handle for the bottle.

Because these widely known carrying handles are made thick in order to have sufficient strength, and are in a non-stretched state together with the neck portion, when the resin material is a polyester resin, for example, PET, then the handle is hard without sufficient flexibility and is thus difficult to bend. The bottle cannot, therefore, be held hanging vertically.

Furthermore, unstretched PET is deficient in impact strength so that when a bottle fully filled with contents falls from a shelf onto the floor, the handle is sometimes broken.

As a novel means for solving these types of problems in conventional carrying handles, the present inventors achieved the following invention. Base portions projected from opposite positions on either side of a neck portion of a bottle were integrally molded with a U shaped carrying handle formed integrally from a grip portion and arm portions on both sides. This carrying handle extended outwards with a length greater than the height of the neck portion. At the same time, the connecting portions at the boundary of the arm portions and the base portions were molded thinly by constricting the thickness of the connecting portions so that the resin is flow-oriented, thereby the carrying handle could be rotated in a vertical direction from the boundary. Thus breakage of the carrying handles could be prevented.

In this novel carrying handle bottle, even if the carrying handle is facing out to the side, if the bottle is picked up by the carrying handle, the carrying handle naturally bends from the thin connecting portion due to the load of the bottle. The arm portions then rotate upwards so that the carrying handle changes to a vertical orientation giving this carrying handle bottle the advantage that it may be carried substantially vertically. Moreover, because the load when the bottle is carried is concentrated at the connecting portion which is strengthened by the flow orientation of the resin, even if the base portion has an unoriented plate-shaped configuration, there is no breakage caused by the load.

The tensile strength in the connecting portion of the carrying handle is extremely high and is able to sufficiently withstand the weight of even a large size bottle (for example, one having a capacity of 5 liters). There is thus no breakage at all at the boundary or in the base portion (which has a plate thickness of 1.4 mm) caused by the load even after repeated use.

However, if a filled bottle falls from a high place, the phenomenon of cracks appearing in the base portion does sometimes occur. The reason for this is assumed to be that the stress from the impact is concentrated in the neck portion of the bottle and the distortion in the neck portion caused by this acts on the plate-shaped base portion which is connected orthogonally to the vertical neck portion, thus causing the cracks. For this reason, attempts have been made to improve the strength of the base portion by increasing the plate thickness. However, when the plate thickness was increased up to a certain point, the effect achieved did not match that expected. When the plate thickness was then increased even further, a new problem arose in that shrinkage occurred in the surface of the base portion.

The present invention was conceived in order to solve the above described problems and it is an object thereof to provide a biaxially stretched bottle having a new carrying handle, in which the plate-shaped base portion is strengthened against impact force without the actual structure of the carrying handle being altered and has the tensile strength thereof further improved, and which is sufficiently able to withstand use as a large size carrying handle bottle.

DISCLOSURE OF THE INVENTION

In accordance with the above objects, the present invention is a biaxially stretched bottle formed of a thermoplastic resin in which, during injection molding of the preform, a carrying handle is formed integrally with side surfaces below a neck portion, and the carrying handle is formed as a carrying handle for a thin wall bottle by biaxially stretch blow molding without further modification, wherein the carrying handle is formed in a U-shaped configuration having a grip portion and arm portions on both sides integrally formed, and has the both arm portions formed integrally with base portions formed from projected pieces formed at symmetrical positions on both sides of the neck portion, which arm portions extend out to the sides with a length greater than the height of the neck portion, and which has boundaries of the base portions and arm portions constricted so as to be molded thinly thereby forming connecting portions which bend freely in a vertical direction, and has the base portions supported by brackets integrally molded with bottom surfaces of the base portions and side surfaces of the neck portion, respectively.

The above base portion may also be formed with a plate-shaped configuration projected in a radial direction together with the bracket on a side surface of the neck portion from an annular ring projectingly molded at the outer periphery of the neck portion.

The above described bottle is formed from a thermoplastic resin such as a polyester resin such as polyethylene terephthalate (PET), polyethylene naphthalate, or the like. Even when the carrying handle is simply injection molded, the flow orientation of the resin when thinly forming the above connecting portion generates flexibility in the carrying handle. Accordingly, the bend strength and impact strength of not only the connecting portions, but also the grip portion and arm portions are increased thereby suppressing breakages.

In this type of biaxially stretched bottle with an attached carrying handle, because the carrying handle which bridges both side portions of the neck portion can be bent vertically at the thinly formed connecting portions, even when the carrying handle is positioned so as to extend out to the side, the carrying handle bends naturally at the thinly formed connecting portions due to the weight of the bottle when the bottle is picked up by the carrying handle. Moreover, the arm portions use the base portions as a support to rotate upwards changing the orientation of the carrying handle to a vertical orientation and allowing the bottle to be carried. Furthermore, even if the bottle falls from a high location, distortion of the base portions is prevented by the vertically oriented brackets which is molded together with the base portions. As a result, in spite of the base portions being formed in a plate-shaped configuration shape, cracks caused by impact are suppressed.

DESCRIPTION OF THE PREFERRED EMBODIMENTS

Figure 1:
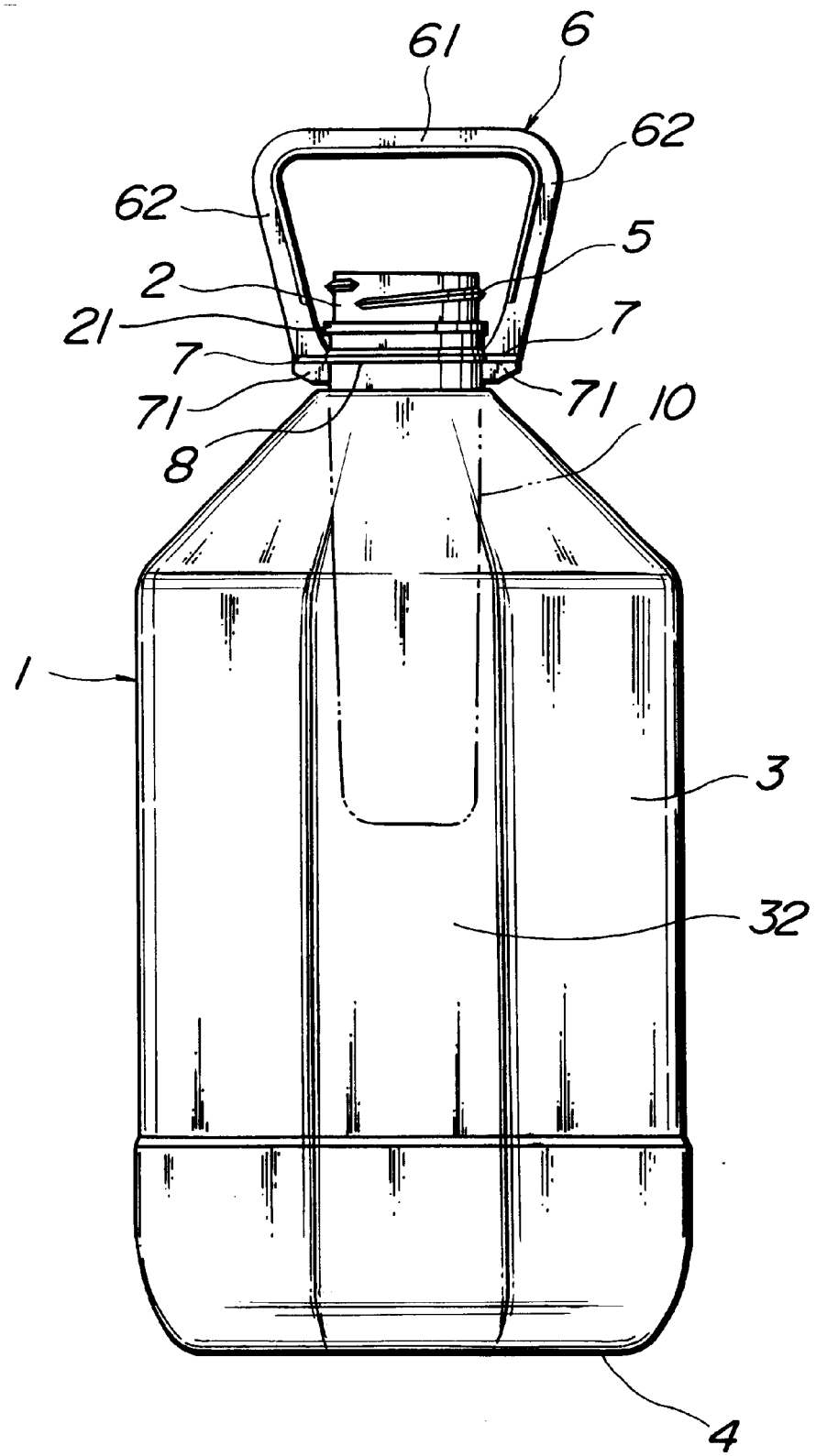
FIG. 1 is a front view of a biaxially stretched bottle having a carrying handle according to the present invention.

The present invention will be explained below in detail with reference to the figures. Reference numeral 1 in FIG. 1 indicates an angular bottle formed from PET. The bottle 1 is formed in a biaxial orientation and has a thin body portion 3 and bottom portion 4 formed by stretch blow molding below the end of a neck portion 2. A carrying handle 6 is integrally formed with side surface of the neck portion 2 below a thread 5 on outer peripheral surfaces.

The carrying handle 6 is molded integrally with the neck portion 2 during injection molding of a preform 10 and may be used without further modification as the carrying handle 6 of the bottle 1. This carrying handle 6 is formed having a U-shaped planar configuration by integrally forming from an elongated plate-shaped body a grip portion 61 and arm portions 62 on both ends of the grip portion 61. The width of the inner edges of the grip 61 and the arm portions 62 are increased to act as wearing surfaces.

The length of the arm portions 62, 62 is greater than the height of the neck portion 2. Moreover, the arm portions 62, 62 are integrally formed with base portions 7, 7 formed from projected pieces located at symmetrical positions on both sides of the neck portion 2. Accordingly, the carrying handle 6 extends outwards forming a long bridge over both sides of the neck portion 2.

The base portions 7, 7 are formed so as to be projected in a radial direction from the annular ring 8 which is below a support ring 21 projectingly molded on the outer periphery of the neck portion 2 in a wide shape and with the same thickness as the arms portions 62. The boundary of the base portion 7 and the arm portion 62 is formed thinly by being constricted and functions as a connecting portion 9, which is able to bend freely in a vertical direction.

Furthermore, the base portions 7, 7 are projected in a radial direction in a plate shape so as to be supported by the side surfaces of the neck portion 2 together with brackets 71 having a uniform thickness and formed from vertical plates formed integrally with the bottom surfaces of the base portions and the side surfaces of the neck portion, respectively. The positions at which the base portions 7, 7 are projectingly molded may lie on the center line X—X of the bottle main body without any particular problem arising. However, if consideration is given to the task of pouring out the bottle contents, it is preferable if the distal edges of the base portions 7, 7 are both positioned to one side of the center line X—X while remaining adjacent thereto, and while also remaining positioned symmetrically each other on both sides of the neck portion. Accordingly, even if the carrying handle 6 is positioned vertically across the bottle opening, by positioning the base portions 7, 7 to one side, in this way, the bottle body tilts slightly when carried, thus making the user conscious that the bottle contents are to be poured from the edge of the bottle opening on the side opposite to the side at which the carrying handle is provided.

Figure 2:
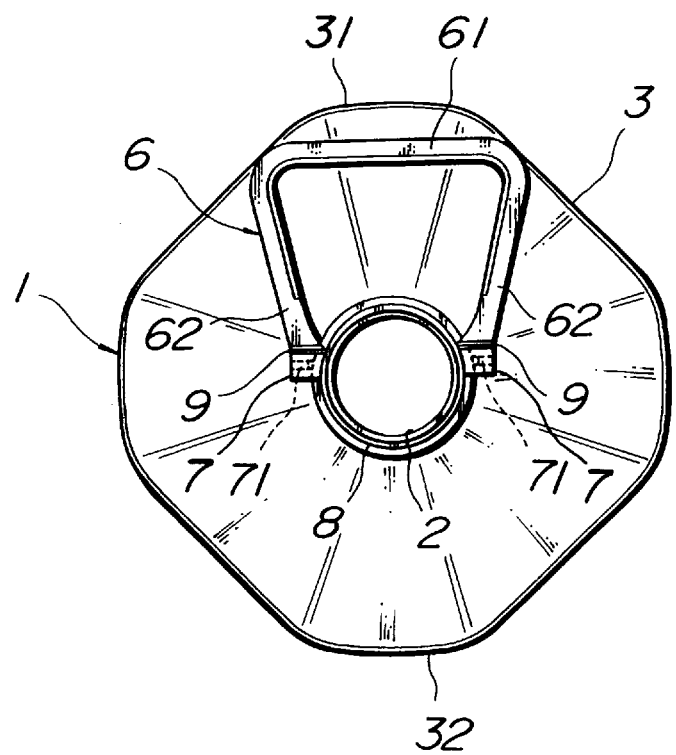
FIG. 2 is a plan view of the biaxially stretched bottle shown in FIG. 1
Figure 3:
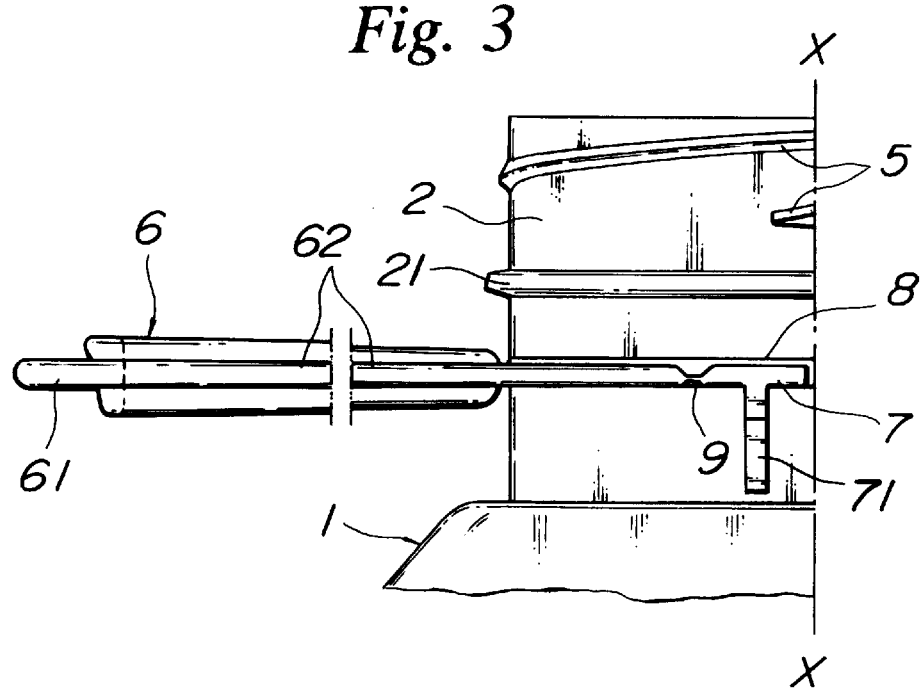
FIG. 3 is an enlarged side view showing a half of the neck portion of the biaxially stretched bottle having a carrying handle according to the present invention.

Furthermore, if the bottle has an angular body portion 3 and therefore has directionality, then, as is shown in FIG. 2, it is preferable that the carrying handle is formed facing towards one corner portion 31 of the bottle body. In this case, the corner portion 32, positioned on the opposite side to the carrying handle 6, is lowered when pouring. When pouring out contents of which only a small amount remains, because the lower positioned corner portion 32 acts as a gutter, the volume of the contents which flow into the corner portion 32 increases, thus making pouring easier.

Figure 6:
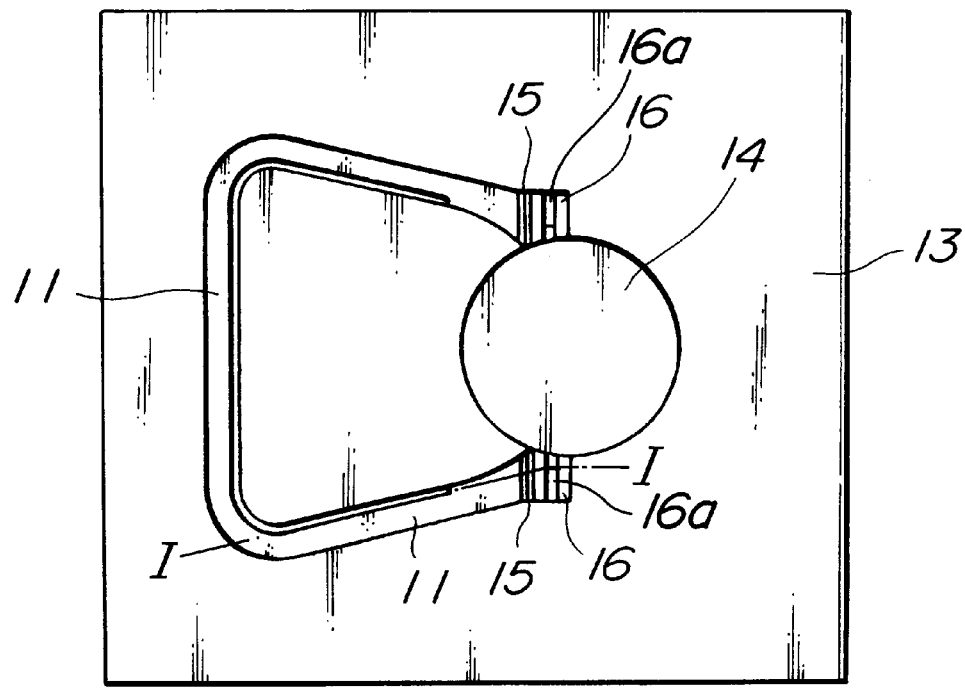
FIG. 6 is a plan view of a mold for molding a body portion of a preform showing a cavity for molding the carrying handle of the biaxially stretched bottle having a carrying handle according to the present invention.
Figure 7:
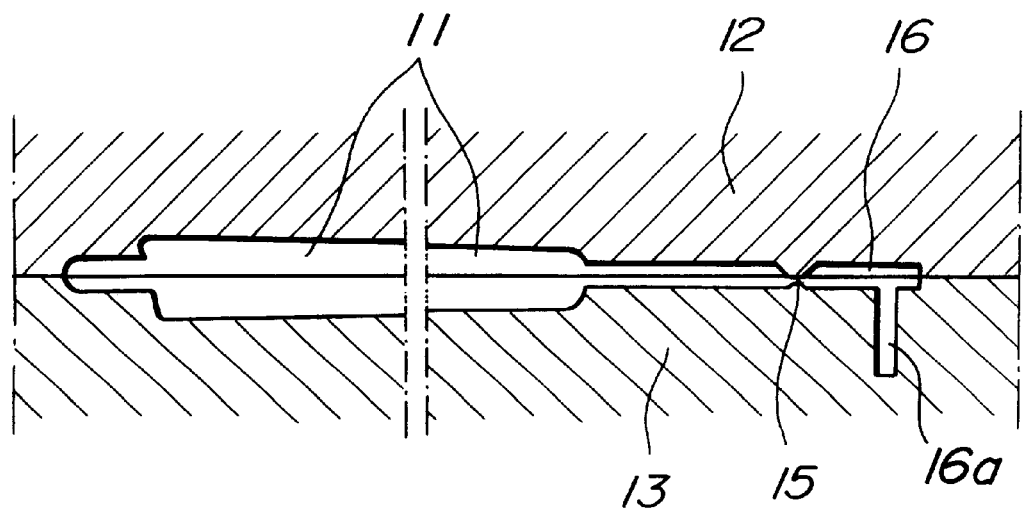
FIG. 7 is a cross-sectional view taken along the line I—I in FIG. 6.

The connecting portion 9, which is formed by constricting the boundary of the base portion 7 and the arm portion 62, and the bracket 7 are formed during the injection molding of the carrying handle 6. As is shown in FIGS. 6 and 7, a flat carrying handle cavity 11 for forming the carrying handle 6 is formed extending across both parting surfaces of a body portion molding mold 13 and a neck portion molding mold 12 of a preform 10, and is connected to a body cavity 14. A desired flow gap 15 is formed at the position of the carrying handle cavity 11 at which the connecting portion 9 is molded by mutual protrusions on the upper and lower mold surfaces, thereby forming a constricted portion. The base portion cavity 16 is partitioned by the constricted portion. Moreover, a bracket molding concave portion 16a is formed vertically on the body portion molding mold 13 side of the base portion cavity 16.

The carrying handle cavity 11 and the bracket molding concave portion 16a are filled with molten resin from the base portion cavity 16 side through the flow gap 15. The resin molecules are oriented by passing through the restricted flow gap 15 and thus flexibility is generated in the resin forming the connecting portion 9 and the carrying handle 6. This coupled with thin molding imparts sufficient toughness to the connecting portion 9, in particular, to withstand the stress of bending. In this way, the carrying handle 6 can be bent from the connecting portion 9 thereof and rotated vertically without resistance around the base portion 7 (see FIG. 4).

Figure 4:
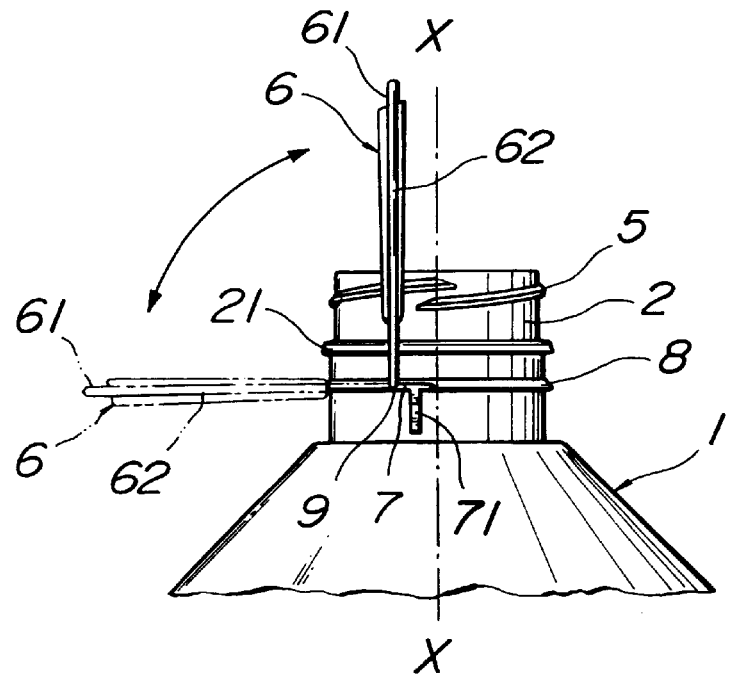
FIG. 4 is a side view of the top portion of the biaxially stretched bottle having a carrying handle of the present invention showing rotated states of the handle.
Figure 5:
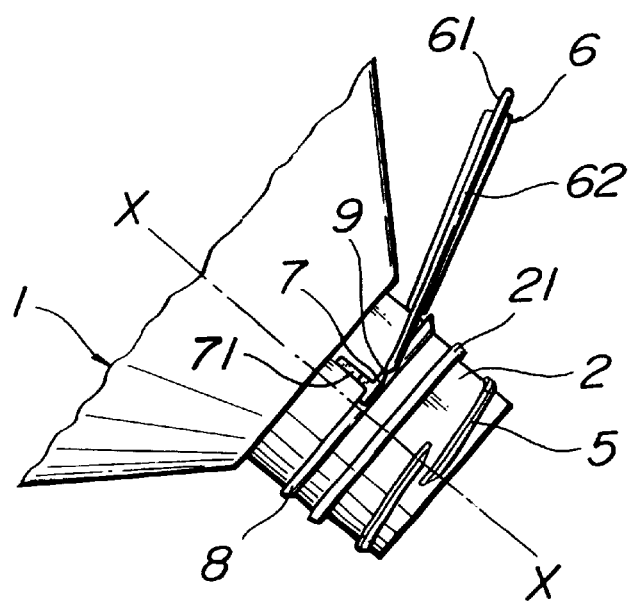
FIG. 5 is a side view of the top portion of the biaxially stretched bottle having a carrying handle according to the present invention showing the position of the carry handle when the bottle contents are poured from the bottle.

As a result of the above described type of structure, even if the carrying handle 6 is positioned extending out horizontally from the side of the neck portion 2 during molding, the carrying handle 6 is still able to be used as a carrying handle positioned vertically bridging the bottle mouth, as shown in FIG. 4. Moreover, if the carrying handle 6 is held by one hand and the other hand used to support the bottom portion 4 of the bottle 1 so that the edge of the bottle opening slants downwards in order to pour out the bottle contents, the carrying handle 6 bends naturally and is rotationally displaced so as to be inclined in the position shown in FIG. 5. Therefore, the carrying handle 6 does not provide any resistance to the tilting of the bottle, and the bottle contents can be smoothly poured out even from a heavy 3 liter or even a 5 liter bottle.

Note that, in the above embodiment, the planar configuration of the carrying handle 6 was formed in a U shape, however, this shape may be optionally set in accordance with the bottle shape, and the shape of the carrying handle of the present invention is not limited to that shown in the figures. Moreover, the cross-sectional configuration of the carrying handle 6 and base portion 7 is not limited to a plate-shaped configuration and may be formed in a circular configuration, an elliptical configuration, or the like.

EXAMPLE

| | |
|---|---|
| Edible Oil bottle | 5 liter (rectangular) |
| Resin material | Polyethylene terephthalate |
| Height of neck portion | 35 mm |
| Outside diameter of neck portion | 42 mm |
| Overall length of carrying handle | 66 mm |
| Breadth of carrying handle (grip portion side) | 85 mm |
| Breadth of v handle (base portion side) | 63 mm |
| Width of carrying handle and base portion plate | 7.0 mm |
| Thickness of carrying handle and base portion plate | 1.5 mm |
| Length of base portion projected pieces | 8.0 mm |
| Thickness of bracket | 1.5 mm |
| Height of bracket | 8.0 mm |
| Length of connecting portion | 2.0 mm |
| Thickness of connecting portion | 0.4 mm |

Industrial Applicability

In the above-described type of biaxially stretched bottle with attached carrying handle, distortion of the base portion is prevented by a vertically aligned bracket molded together with the base portion even if the bottle falls from a high location. As a result, cracks caused by the impact are suppressed even if the base portion is formed in a plate-shaped configuration. Moreover, because the carrying handle can be bent vertically at the thinly formed connecting portion, even if the carrying handle is positioned extending out to the side, when the bottle is picked up by the carrying handle, the carrying handle bends naturally at the thinly formed connecting portion due to the weight of the bottle. Thus a biaxially stretched bottle having a new carrying handle sufficiently able to withstand use in a large size carrying handle bottle can be provided.

What is claimed is:

1. A biaxially stretched bottle formed of a thermoplastic resin in which, during injection molding of the preform, a carrying handle is formed integrally with side surfaces of a neck portion, the neck portion having an upper portion on which screw threads are disposed and a lower portion extending between the upper portion and a shoulder portion of the bottle, and the carrying handle is formed as a carrying handle for a thin bottle by biaxially stretch blow molding without further modification, wherein the carrying handle is formed in a U-shaped configuration having a grip portion and arm portions on both sides integrally formed, and has the both arm portions formed integrally with flat, horizontal base portions projecting from symmetrical positions on both sides of the lower portion of the neck portion, which arm portions extend out to the sides with a length greater than the height of the neck portion, and which has boundaries of the base portions and arm portions constricted so as to be molded thinly thereby forming connecting portions which bend freely in a vertical direction, and has the base portions supported by vertical brackets disposed below the respective base portions and integrally molded with bottom surfaces of the base portions and side surfaces of the lower portion of the neck portion, respectively.

2. The biaxially oriented bottle having a carrying handle according to claim 1, in which the base portions and the brackets project from an annular ring projectingly molded at the outer periphery of the lower portion of the neck portion.

3. The biaxially oriented bottle having a carrying handle according to claim 2, in which the base portions and the brackets are formed so as to project in a radial direction from the annular ring.

* * * * *